(12) United States Patent
Huang et al.

(10) Patent No.: US 11,364,627 B2
(45) Date of Patent: Jun. 21, 2022

(54) JOINT SUPPORT STRUCTURE OF A ROBOT AND A ROBOT HAVING THE SAME

(71) Applicant: Beijing Institute of Technology, Beijing (CN)

(72) Inventors: Qiang Huang, Beijing (CN); Chunlei Zhang, Beijing (CN); Junyao Gao, Beijing (CN); Zhangguo Yu, Beijing (CN); Huaxin Liu, Beijing (CN)

(73) Assignee: Beijing Institute of Technology, Beijing (CN)

( * ) Notice: Subject to any disclaimer, the term of this patent is extended or adjusted under 35 U.S.C. 154(b) by 115 days.

(21) Appl. No.: 16/848,634

(22) Filed: Apr. 14, 2020

(65) Prior Publication Data
US 2021/0008713 A1    Jan. 14, 2021

(30) Foreign Application Priority Data
Jul. 11, 2019    (CN) .......................... 201910626232.0

(51) Int. Cl.
*B25J 9/10* (2006.01)
*B25J 9/00* (2006.01)
(Continued)

(52) U.S. Cl.
CPC ........... *B25J 9/1025* (2013.01); *B25J 9/0009* (2013.01); *B25J 9/12* (2013.01); *B25J 15/00* (2013.01)

(58) Field of Classification Search
CPC ........... B25J 9/0009; B25J 9/12; B25J 9/1025
(Continued)

(56) References Cited

U.S. PATENT DOCUMENTS

| 4,699,563 A | * | 10/1987 | Yokose | ................ B25J 17/0241 |
| | | | | 414/744.5 |
| 4,955,250 A | * | 9/1990 | Fisher | .................... B25J 9/0084 |
| | | | | 191/12 R |
| 8,731,716 B2 | | 5/2014 | Jacobsen et al. | |

FOREIGN PATENT DOCUMENTS

| CN | 102744731 A | 10/2012 |
| CN | 207985003 U | 10/2018 |

(Continued)

OTHER PUBLICATIONS

State Intellectual Property Office of the People's Republic of China (ISR/CN), International Search Report for CN20191062320, China, dated Jun. 16, 2020.

(Continued)

*Primary Examiner* — William C Joyce
(74) *Attorney, Agent, or Firm* — Hamre, Schumann, Mueller & Larson, P.C.

(57) ABSTRACT

The present disclosure provides a joint support structure of a robot and a robot having the same. The joint support structure comprises: a drive motor; a reducing transmission mechanism; a motor side casing; a transmission side casing; and a knee joint sleeve disposed on outer peripheries of the motor side casing and of the transmission side casing and connected to the reducing transmission mechanism; the motor side casing has a first annular groove; the transmission side casing has a second annular groove; the knee joint sleeve is provided with an annular connector circumferentially surrounding the motor side casing, and the annular connector has a third annular groove matched with the first annular groove to form a first ball track for accommodating first balls; the knee joint sleeve has a fourth annular groove is matched with the second annular groove to form a second ball track.

16 Claims, 3 Drawing Sheets

(51) Int. Cl.
*B25J 9/12* (2006.01)
*B25J 15/00* (2006.01)

(58) Field of Classification Search
USPC .......................................... 74/490.03, 490.05
See application file for complete search history.

(56) References Cited

FOREIGN PATENT DOCUMENTS

| | | |
|---|---|---|
| CN | 210361381 U | 4/2019 |
| CN | 104942820 A | 9/2019 |
| WO | WO2010025403 A1 | 3/2010 |

OTHER PUBLICATIONS

State Intellectual Property Office of the People's Republic of China, First Office Action for CN20191062320, China, dated Jun. 22, 2020.

* cited by examiner

JOINT SUPPORT STRUCTURE OF A ROBOT AND A ROBOT HAVING THE SAME

The present invention claims the priority of the patent application with application number of CN201910626232.0, filed on Jul. 11, 2019, which is hereby incorporated by reference in its entirety.

TECHNICAL FIELD

The present disclosure relates to a humanoid robot and particularly to a joint support structure of a robot and a robot having the same.

BACKGROUND

The humanoid robot symbolizes an advanced development stage of the robot technology, which embodies the research and development level of the robot in mechanism, kinematics and dynamics, or the like. With the strong obstacle crossing capability, omnidirectional adjustment of moving direction, strong terrain adaptability, good movement flexibility and high carrying capacity, the humanoid robot is the best choice in a complex operation environment, and has a wide application prospects. The volume and mass of the large-sized legged robot are high, so a large moment of inertia is generated by the legs during walking when the leg mass is large, which has an obvious influence on the movement stability. Therefore, how to reduce the weight of the legs is one of the focus problems that the legged robot faces.

SUMMARY

In view of the above technical problem, the embodiments of the present disclosure provide a joint support structure of a robot and a robot having the same, so as to optimize the joint structure space and reduce the weight of the whole joint, thereby improving the flexibility and the movement performance of the robot.

The technical solutions of the present disclosure are as follows.

According to an aspect of the present disclosure, there is provided a joint support structure of a robot, comprising: a drive motor; a reducing transmission mechanism coaxially connected to the drive motor; a motor side casing circumferentially surrounding the drive motor and fixedly connected to the drive motor; a transmission side casing circumferentially surrounding the reducing transmission mechanism and fixedly connected to the motor side casing; and a knee joint sleeve disposed on outer peripheries of the motor side casing and of the transmission side casing and connected to an output end of the reducing transmission mechanism;

the motor side casing has a first annular groove in a circumferential direction thereof;

the transmission side casing has a second annular groove in a circumferential direction thereof;

the knee joint sleeve is integrally provided with or detachably connected to an annular connector circumferentially surrounding the motor side casing, and the annular connector has a third annular groove matched with the first annular groove to form a first ball track for accommodating first balls, so that the first balls are uniformly distributed along the first ball track in the circumferential direction of the motor side casing;

the knee joint sleeve has a fourth annular groove at a position corresponding to the second annular groove of the transmission side casing, and the fourth annular groove is matched with the second annular groove to form a second ball track for accommodating second balls, so that the second balls are uniformly distributed along the second ball track in the circumferential direction of the transmission side casing.

Optionally, the annular connector is a first press ring; the first press ring has external threads on its outer circle, and is detachably connected into the knee joint sleeve by use of threaded connection.

Optionally, the joint support structure of the robot further comprises an inner thigh plate, an outer thigh plate, an inner calf plate and an outer calf plate; the inner thigh plate and the outer thigh plate are connected to each other through a connector and mounted on a side close to the drive motor and a side close to the reducing transmission mechanism, respectively, and the inner thigh plate is fixedly connected to the motor side casing; the inner calf plate and the outer calf plate are fixedly connected to the knee joint sleeve.

Optionally, a sidewall of an end of the knee joint sleeve adjacent to the outer thigh plate is provided with a fifth annular groove surrounding a transmission shaft of the reducing transmission mechanism; the outer thigh plate is provided with a sixth annular groove at a position corresponding to the fifth annular groove, and the sixth annular groove is matched with the fifth annular groove to form a third ball track for accommodating third balls, so that the third balls are uniformly distributed along the third ball track in a circumferential direction of the transmission shaft.

Optionally, the joint support structure further comprises a side cover plate fixed with the inner thigh plate and the motor side casing by screws or by rabbet fitting and screws.

Optionally, the reducing transmission mechanism is a harmonic reducer, which comprises a wave generator, a harmonic rigid wheel and a flexible wheel; the motor side casing, the harmonic rigid wheel and the transmission side casing are fixedly connected by screws or by rabbet fitting and screws.

Optionally, the inner thigh plate is fixedly connected to the motor side casing by screws or by rabbet fitting and screws; the outer calf plate is fixedly connected to the knee joint sleeve by screws or by rabbet fitting and screws; the outer calf plate is fixedly connected to the knee joint sleeve by screws or by rabbet fitting and screws.

Optionally, the first annular groove is positioned at a root of a shaft shoulder of one end of the motor side casing; the third annular groove is positioned on a sidewall of the first press ring; the second annular groove is positioned at an end of the transmission side casing close to an output end thereof.

Optionally, the joint support structure further comprises: a second press ring arranged side by side with the first press ring and positioned at a side of the first press ring away from the motor side casing; the second press ring has external threads on its outer circle, so as to be fixedly connected into the knee joint sleeve by use of threaded connection and tightly press the first press ring towards the first ball track.

According to another aspect of the present disclosure, there is further provided a robot, comprising the aforementioned joint support structure.

In the joint support structure and the robot provided in the embodiments of the present disclosure, the traditional bearings are cancelled and the joint support structure is integrally designed. In addition, the support structure adopts a whole circle of balls rolling in the ball track formed by the matched grooves of the respective structural members, thereby optimizing the structural space of the joint, greatly reducing the weight of the joint, and improving the flexibility and the movement performance of the robot.

Further, the embodiments of the present disclosure also use an anti-loosening press structure (such as a press ring) to ensure the positioning accuracy and the connection rigidity of the rotary support.

Additional advantages, objectives, and features of the present disclosure will be set forth in part in the following description, and in part will become apparent to persons of ordinary skills in the art upon the examination of the following text, or may be learned by a practice of the present disclosure. The objectives and other advantages of the present disclosure can be realized and attained by the structures particularly pointed out in the written description and the claims thereof as well as the drawings.

Those skilled in the art will appreciate that the objectives and advantages that can be achieved by the present disclosure are not limited to those described above, and the above and other objectives that can be achieved by the present disclosure will be more clearly understood from the following detailed description.

BRIEF DESCRIPTION OF THE DRAWINGS

The drawings described herein are used to provide further understanding of the present disclosure, and constitute a part of the present application rather than limitations to the present disclosure. The components in the drawings are not drawn to scale, but merely to illustrate the principle of the present disclosure. For the convenience of illustrating and describing some parts of the present disclosure, corresponding parts in the drawings may be enlarged, i.e., may become larger relative to other parts in an exemplary device practically manufactured according to the present disclosure. In the drawings.

REFERENCE NUMBERS

Figure 1:
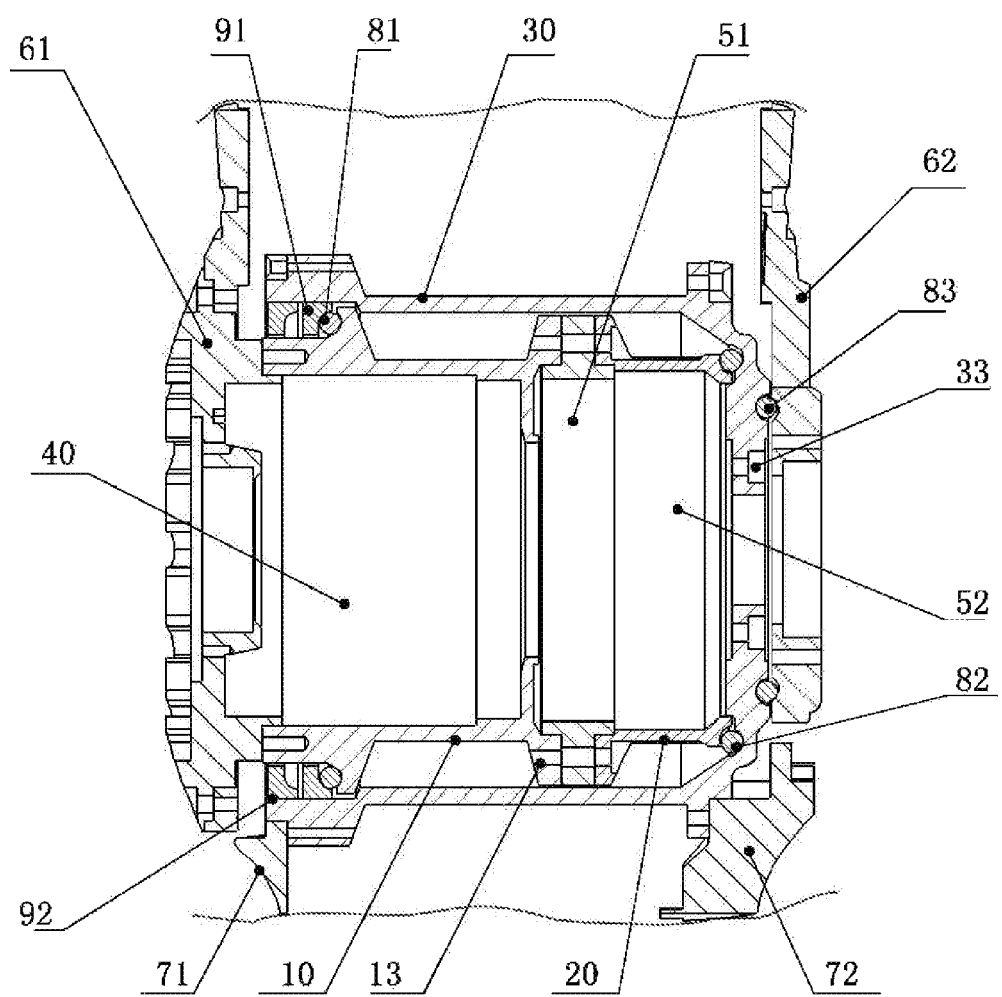
FIG. 1 is a schematic cross-sectional view of a joint support structure of a robot according to an embodiment of the present disclosure.

10: motor side casing; 20: transmission side casing; 30: knee joint sleeve;
40: motor; 51: harmonic rigid wheel; 52: flexible wheel;
13, 33: screw; 61: inner thigh plate; 62: outer thigh plate;
71: inner calf plate; 72: outer calf plate; 73: side cover plate;
81: first ball; 82: second ball; 83: third ball;
84: first annular groove; 85: second annular groove; 86: third annular groove;
87: fourth annular groove; 88: fifth annular groove; 89: sixth annular groove;
91: first press ring; 92: second press ring;
01: first ball track; 02: second ball track; 03: third ball track.

DETAILED DESCRIPTION OF THE PREFERRED EMBODIMENTS

In order that the objective, the technical solutions and the advantages of the present disclosure are clearer, the present disclosure will be described in further details as follows with reference to the embodiments and drawings. Here, the illustrative embodiments of the present disclosure and the descriptions thereof are used to explain the present disclosure, but are not intended to limit the present disclosure.

It should be noted that when an element is referred to as being 'disposed' on another element, it may be directly on another element or there may be an intermediate element there between. When an element is regarded as being 'connected' to another element, it may be directly connected to another element or there may be an intermediate element at the same time. The terms 'mount', 'connect' and "link" should be understood in a broad sense. For example, a connection may be a mechanical connection or an electrical connection, or an internal communication between two elements, or a direct connection, or an indirect connection through an intermediate medium. For persons of ordinary skills in the art, the specific meanings of the above terms can be understood according to the specific conditions. The terms 'vertical', 'horizontal', 'upper', 'lower', 'left', 'right' and similar expressions used herein are for an illustration purpose only rather than indicating a unique embodiment.

Here, it should also be noted that in order to avoid obscuring the present disclosure due to unnecessary details, only the structures and/or processing steps closely related to the solutions according to the present disclosure are illustrated in the drawings, and other details not so related to the present disclosure will be omitted.

It should be emphasized that the term 'comprise/include/have' used herein refers to the presence of features, elements, steps or components, but does not preclude the presence or addition of one or more other features, elements, steps or components. Here, it should also be noted that the term 'connection' herein may refer not only to a direct connection but also to an indirect connection in which an intermediate is existed, unless otherwise specified. Hereinafter, the embodiments of the present disclosure will be described with reference to the drawings. In the drawings, the same reference number denotes the same or similar parts or steps.

The key structure of the leg of a legged humanoid robot is the joint part. The existing joint support structure of the legged humanoid robot mostly adopts paired bearings for support, which not only enable the leg to rotate at the joint but also ensure the rigidity of the joint, thereby keeping each joint of the leg of the robot being stable. Among the paired bearings for support, the deep groove ball bearings, the angular contact ball bearings, the crossed roller bearings or the four-point contact ball bearings are generally selected.

However, the weight of the joints of the legs is greatly increased due to the superposition of the weights of the joint part structures and of the bearings of the joint support structure of the legged humanoid robot, which adopts the bearings such as the deep groove ball bearings, the angular contact ball bearings, the crossed roller bearings or the four-point contact ball bearings for support, so that the load is increased when the robot walks, and the volume and weight become larger, while a larger weight needs to be driven by a larger power motor that requires a larger structure for support.

A technical problem to be solved is how to optimize the joint structure space, so as to reduce the weight of the whole joint and improve the flexibility and the movement performance of the robot.

Figure 2:
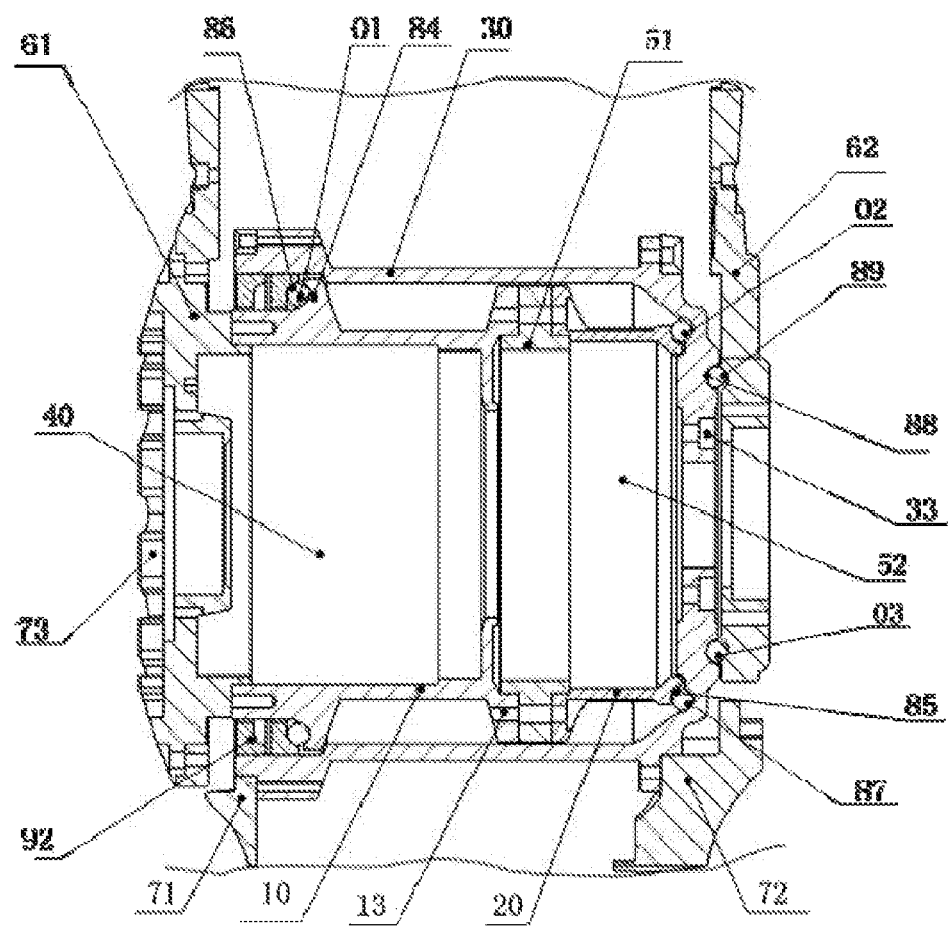
FIG. 2 is a schematic cross-sectional view of a joint support structure of a robot with balls not shown according to an embodiment of the present disclosure.

The present disclosure provides a joint support structure of a robot, for solving the problem in the prior art that the load during walking and the drive power of the motor are too high due to a large weight of the joint support structure of the robot. FIG. 1 illustrates a schematic cross-sectional view of a concentric rotary joint support structure of a robot according to an embodiment of the present disclosure. FIG. 2 illustrates a schematic cross-sectional view of a concentric rotary joint support structure of the robot, in which balls are not illustrated to facilitate the explanation of other structures. As illustrated in FIGS. 1 and 2, the joint support structure of the robot comprises: a drive motor; a reducing transmission mechanism coaxially connected to the drive motor; a motor side casing (or a motor casing for short) 10 circumferentially surrounding the drive motor and fixedly connected to the drive motor; a transmission side casing 20 circumferentially surrounding the reducing transmission mechanism and fixedly connected to the motor side casing; and a knee joint sleeve 30 disposed on outer peripheries of the motor side casing and of the transmission side casing and connected to an output end of the reducing transmission mechanism.

In an embodiment of the present disclosure, the paired bearings for support in the existing joint support structure are removed, a ball track between the knee joint sleeve 30 and the motor side casing 10 and a ball track between the knee joint sleeve 30 and the transmission side casing 20 for accommodating balls are formed through an integrated design, and the support performance, the movement performance and the flexibility of the robot joint are realized by rolling the balls in the ball track, thereby optimizing the structural space of the joint and reducing the weight of the joint.

More specifically, the motor side casing 10 has an annular groove, i.e., a first annular groove 84, in a circumferential direction thereof. In an example, the first annular groove 84 is formed at a root of a shaft shoulder of the motor side casing 10, i.e., a position of the motor side casing 10 accommodating the balls 81 as illustrated in FIG. 1; the opening direction of the groove 84 is inclined upward by an angle with respect to a horizontal direction, and the angle can be flexibly set (preferably between 30° and 60°, such as 45°). However, the present disclosure is not limited thereto, and the first annular groove may also be positioned at an edge of one end of the motor side casing 10, on a sidewall of the motor side casing 10, or on an outer peripheral surface of the motor side casing 10; the opening direction of the groove may also be flexibly set based on the groove position, such as being inclined upward by an angle with respect to the horizontal direction (e.g., when the groove is positioned at the edge), being radially outward along a circumference (e.g., when the groove is positioned on the outer peripheral surface of the motor side casing 10), or being in the horizontal direction (e.g., when the groove is positioned on the sidewall of the motor side casing 10).

Accordingly, the knee joint sleeve 30 may be integrally formed with or detachably connected to an annular connector circumferentially surrounding the motor side casing, such as a first press ring 91 illustrated in FIG. 1. The first press ring 91 may be integrally formed on the knee joint sleeve 30, or may be fixed in the knee joint sleeve 30 through threads machined on the outer ring surface of the first press ring 91. In an embodiment of the present disclosure, the manner that the first press ring is detachably connected to the knee joint sleeve 30 by use of threaded connection is preferably selected, so that the tightness of the press ring can be flexibly adjusted while forming the ball track for accommodating first balls, thereby improving the operation reliability of the ball track. The position of the annular connector is corresponding to the position of the first annular groove, and the annular connector has a third annular groove 86 matched with the first annular groove 84 to form a first ball track 01 for accommodating first balls 81, so that the first balls 81 can be uniformly distributed in a circle along the first ball track 01 in the circumferential direction of the motor side casing 10. The whole circle of balls rolling in the ball track not only has a supporting function, but also ensures the positioning accuracy of the ball track on both sides. In another embodiment of the present disclosure, one or more second press rings may be arranged side by side with the first press ring, and the second press ring has threads machined on an outer ring surface thereof and fixed in the knee joint sleeve 30 through the threads. The second press ring may be arranged on the outer side of the first press ring, fixedly connected into the knee joint sleeve by use of threaded connection, and tightly press the first press ring towards the first ball track, so as to pre-tighten the first press ring on the inner side as an anti-loosening press ring, thereby further improving the reliability of the threaded structure and ensuring the positioning precision and the connection rigidity of the rotary support structure. In some embodiments of the present disclosure, the structure of the second press ring is preferably the same as that of the first press ring, i.e., it also has annular grooves, so as to be used interchangeably with the first press ring and reduce the weight as much as possible. However, in other embodiments of the present disclosure, the structure of the second press ring may be different from that of the first press ring as long as the second press ring can pre-tighten the first press ring on the inner side.

In addition, in the embodiment of the present disclosure, the transmission side casing 20 has a second annular groove 85 in a circumferential direction thereof. In the example illustrated in FIG. 2, the second annular groove 85 is positioned at one end of the transmission side casing 20 close to an output end thereof, such as at an edge of the transmission side casing close to the output end thereof, but the present disclosure is not limited thereto, and the second annular groove 85 may be at any other position in contact with or adjacent to the knee joint sleeve.

Accordingly, the knee joint sleeve 30 has a fourth annular groove 87 at a position corresponding to the second annular groove 85 of the transmission side casing 20, and the fourth annular groove 87 is matched with the second annular groove 85 to form a second ball track 02 for accommodating second balls 82, so that the second balls are uniformly distributed in a circle along the second ball track in the circumferential direction of the transmission side casing. The whole circle of balls rolling in the ball track 02 not only has a supporting function, but also ensures the positioning accuracy of the ball track on both sides.

In the example illustrated in FIGS. 1 and 2, in a case where the joint support structure is applied to a joint support structure of a leg of a humanoid robot, the joint support structure may further comprise an inner thigh plate 61, an outer thigh plate 62, an inner calf plate 71 and an outer calf plate 72, wherein the inner thigh plate 61 and the outer thigh plate 62 may constitute a part of a thigh structure of the robot, and the inner calf plate 71 and the outer calf plate 72 may constitute a part of a calf structure of the robot.

Figure 3:
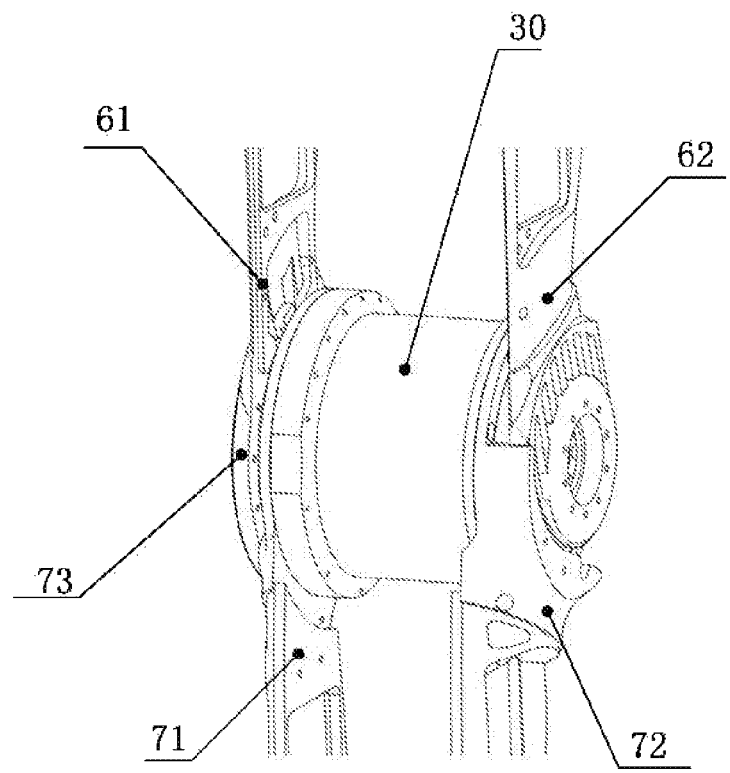
FIG. 3 is a schematic perspective structural view of a joint support structure of a robot according to an embodiment of the present disclosure.

In one embodiment of the present disclosure, the inner thigh plate and the outer thigh plate may be relatively fixed and connected to the motor side casing 10. More specifically, the inner thigh plate 61 may be fixedly connected to the motor side casing 10. For example, the inner thigh plate 61 and the motor side casing 10 may be fixedly connected into a whole by screws. The inner thigh plate 61 may be fixedly connected to the outer thigh plate 62 through a connector (such as a connecting rod not shown). The inner thigh plate 61 and the outer thigh plate 62 may be mounted on a side close to the drive motor and a side close to the reducing transmission mechanism, respectively. The inner thigh plate 61 and the outer thigh plate 62 together form a part of the thigh structure of the robot. Further, the inner thigh plate and the motor side casing may be fixedly connected to each other by screws, or by rabbet fitting and screws. The mounting and positioning accuracy and the structural stability can be ensured by the connection using rabbet fitting and screws, and the rigidity of the thigh can be ensured by combining the inner thigh plate and the outer thigh plate into a whole. In other embodiments of the present disclosure, a side of the inner thigh plate away from the motor side casing may also have a side cover plate 73 as illustrated in FIG. 3, which may be fixed with the inner thigh plate and the motor side casing by screws, or by rabbet fitting and screws. The side cover plate can increase the flexibility of disassembly and assembly.

The inner calf plate and the outer calf plate may be relatively fixed and connected to the knee joint sleeve 30. For example, the outer calf plate 72 may be fixed to the knee joint sleeve 30 by screws, and the inner calf plate 71 may be fixed to the knee joint sleeve 30 by screws. Alternatively, the outer calf plate 72 may be fixed to the knee joint sleeve 30 by rabbet fitting, and the inner calf plate 71 may be fixed to the knee joint sleeve 30 by rabbet fitting. Alternatively, the outer calf plate 72 may be fixed to the knee joint sleeve 30 by screws and rabbet fitting, and the inner calf plate 71 may be fixed to the knee joint sleeve 30 by screws and rabbet fitting. The mounting and positioning accuracy and the structural reliability can be ensured by the connection using rabbet fitting and screws, and the rigidity of the calf can be ensured by combining the inner calf plate and the outer calf plate into a whole. Based on the connection structures for the thigh and the calf with the joints, when the knee joint sleeve 30 rotates relative to the motor casing under the drive of the output end of the reducing transmission mechanism, the relative rotation between the calf and the thigh can be realized, thereby achieving the walking process of the robot.

In one embodiment of the present disclosure, the reducing transmission mechanism may be a harmonic reducer, which may comprise a wave generator (not shown), a harmonic rigid wheel and a flexible wheel (not shown), wherein the flexible wheel is an output end of the harmonic reducer. Since the motor and the harmonic reducer are conventional drive and transmission mechanisms in the prior art, the specific descriptions of their principles and detailed structures are omitted here, and the drive motor 40, the harmonic rigid wheel 51 and the flexible wheel 52 are only schematically illustrated at the mounting positions thereof in FIG. 1, which does not affect the implementation of the present disclosure. In the embodiment of the present disclosure, the reducing transmission mechanism may be one mechanism other than the harmonic reducer. No matter what kind of reducing transmission mechanism is adopted, the transmission shaft of the motor rotates to actuate the harmonic reducer, and an output is made from the flexible wheel of the harmonic reducer after a deceleration.

In the embodiment of the present disclosure, the motor side casing 10 and the transmission side casing 20 are relatively fixed, and the knee joint sleeve 30 is fixedly connected to the output end (such as the flexible wheel) of the reducing transmission mechanism. More specifically, as illustrated in FIG. 1, the motor side casing 10 and the transmission side casing 20 may be fixed together with the harmonic rigid wheel 51 by the screws 13 only or by the rabbet fitting and the screws 13, and the mounting and positioning accuracy and the structural reliability can be further ensured by the connection using rabbet fitting and screws. The knee joint sleeve 30 may be fixedly connected to the sidewall of the flexible wheel by screws 33 or by rabbet fitting and the screws 33, so that the knee joint sleeve 30 can rotate relative to the motor side casing 10 along with the rotation of the output end (such as the flexible wheel) of the reducing transmission mechanism. Just because the knee joint sleeve 30 is fixedly connected to the flexible wheel, the inner calf plate and the outer calf plate are fixedly connected to the knee joint sleeve 30, and the inner thigh side plate and the outer thigh side plate are fixedly connected to the motor side casing, the relative rotation between the calf and the thigh can be realized when the knee joint sleeve 30 rotates relative to the motor casing under the drive of the output end of the reducing transmission mechanism, thereby achieving the walking process of the robot.

In one embodiment of the present disclosure, in order to realize the relative rotation between the outer thigh plate 62 and the knee joint sleeve 30 fixed to the outer calf plate 72, a fifth annular groove 88 surrounding the transmission shaft of the reducing transmission mechanism is provided on a sidewall of an end of the knee joint sleeve 30 adjacent to the outer thigh plate 62. Accordingly, a sixth annular groove 89 is provided on the outer thigh plate 62 at a position corresponding to the fifth annular groove 88, and matched with the fifth annular groove 88 to form a third ball track 03 for accommodating third balls 83, so that the third balls 83 are uniformly distributed in a circle along the third ball track 01 in the circumferential direction of the transmission shaft. The whole circle of balls rolling in the ball track 03 not only has functions of supporting and lubricating, but also ensures the positioning accuracy of the ball track on both sides.

The joint support structure of the robot in the above embodiments of the present disclosure is a novel concentric rotary support structure, in which the traditional bearings are cancelled and the joint support structure is integrally designed. In addition, the support structure adopts circles of balls rolling in the ball tracks formed by the matched grooves of the respective structural members, thereby optimizing the structural space of the joint, greatly reducing the weight of the joint, and improving the flexibility and the movement performance of the robot.

Further, the embodiments of the present disclosure also use an anti-loosening press structure (such as a press ring) to ensure the positioning accuracy and the connection rigidity of the rotary support.

Accordingly, the present disclosure also provides a robot, in particular a humanoid robot, comprising the above concentric rotary support structure. However, in another aspect of the present disclosure, the concentric rotary support structure provided by this embodiment is suitable for not only a humanoid robot, but also a non-humanoid robot with a joint support structure, and in this case, the inner thigh plate, the outer thigh plate, the inner calf plate and the outer calf plate may be replaced by other corresponding connecting member.

In the present disclosure, the features described and/or illustrated for one embodiment may be used in a same or similar way in one or more other embodiments, and/or combined with or replace the features of other embodiments.

Those described above are just preferred embodiments of the present disclosure, and are not intended to limit the present disclosure. Various modifications and variations can be made to the embodiments of the present disclosure by those skilled in the art. Any modification, equivalent substitution, improvement, etc. made within the spirit and principle of the present disclosure should fall within the protection scope of the present disclosure.

What is claimed is:

1. A joint support structure of a robot, comprising:
a drive motor;
a reducing transmission mechanism coaxially connected to the drive motor;
a motor side casing circumferentially surrounding the drive motor and fixedly connected to the drive motor;
a transmission side casing circumferentially surrounding the reducing transmission mechanism and fixedly connected to the motor side casing; and
a knee joint sleeve disposed on outer peripheries of the motor side casing and of the transmission side casing and connected to an output end of the reducing transmission mechanism;
the motor side casing has a first annular groove in a circumferential direction thereof;
the transmission side casing has a second annular groove in a circumferential direction thereof;
the knee joint sleeve is integrally provided with or detachably connected to an annular connector circumferentially surrounding the motor side casing, and the annular connector has a third annular groove matched with the first annular groove to form a first ball track for accommodating first balls, so that the first balls are uniformly distributed along the first ball track in the circumferential direction of the motor side casing;
the knee joint sleeve has a fourth annular groove at a position corresponding to the second annular groove of the transmission side casing, and the fourth annular groove is matched with the second annular groove to form a second ball track for accommodating second balls, so that the second balls are uniformly distributed along the second ball track in the circumferential direction of the transmission side casing,
wherein the annular connector is a first press ring;
the first press ring has external threads on its outer circle, and is detachably connected into the knee joint sleeve by use of threaded connection.

2. The joint support structure according to claim 1, further comprising an inner thigh plate, an outer thigh plate, an inner calf plate and an outer calf plate;
the inner thigh plate and the outer thigh plate are connected to each other through a connector and mounted on a side close to the drive motor and a side close to the reducing transmission mechanism, respectively, and the inner thigh plate is fixedly connected to the motor side casing;
the inner calf plate and the outer calf plate are fixedly connected to the knee joint sleeve.

3. The joint support structure according to claim 2, wherein, a sidewall of an end of the knee joint sleeve adjacent to the outer thigh plate is provided with a fifth annular groove surrounding a transmission shaft of the reducing transmission mechanism;
the outer thigh plate is provided with a sixth annular groove at a position corresponding to the fifth annular groove, and the sixth annular groove is matched with the fifth annular groove to form a third ball track for accommodating third balls, so that the third balls are uniformly distributed along the third ball track in a circumferential direction of the transmission shaft.

4. The joint support structure according to claim 3, further comprising:

a side cover plate fixed with the inner thigh plate and the motor side casing by screws or by rabbet fitting and screws.

5. The joint support structure according to claim 2, wherein,
the inner thigh plate is fixedly connected to the motor side casing by screws or by rabbet fitting and screws;
the outer calf plate is fixedly connected to the knee joint sleeve by screws or by rabbet fitting and screws;
the outer calf plate is fixedly connected to the knee joint sleeve by screws or by rabbet fitting and screws.

6. The joint support structure according to claim 1, wherein,
the reducing transmission mechanism is a harmonic reducer; and
the motor side casing, a harmonic rigid wheel of the reducing transmission mechanism, and the transmission side casing are fixedly connected by screws or by rabbet fitting and screws.

7. The joint support structure according to claim 1, wherein,
the first annular groove is positioned at a root of a shaft shoulder of one end of the motor side casing;
the third annular groove is positioned on a sidewall of the first press ring;
the second annular groove is positioned at an end of the transmission side casing close to an output end thereof.

8. The joint support structure according to claim 1, further comprising:
a second press ring arranged side by side with the first press ring and positioned at a side of the first press ring away from the motor side casing; the second press ring has external threads on its outer circle, so as to be fixedly connected into the knee joint sleeve by use of threaded connection and tightly press the first press ring towards the first ball track.

9. A robot, comprising a joint support structure, wherein the joint support structure comprises:
a drive motor;
a reducing transmission mechanism coaxially connected to the drive motor;
a motor side casing circumferentially surrounding the drive motor and fixedly connected to the drive motor;
a transmission side casing circumferentially surrounding the reducing transmission mechanism and fixedly connected to the motor side casing; and a knee joint sleeve disposed on outer peripheries of the motor side casing and of the transmission side casing and connected to an output end of the reducing transmission mechanism;
the motor side casing has a first annular groove in a circumferential direction thereof;
the transmission side casing has a second annular groove in a circumferential direction thereof;
the knee joint sleeve is integrally provided with or detachably connected to an annular connector circumferentially surrounding the motor side casing, and the annular connector has a third annular groove matched with the first annular groove to form a first ball track for accommodating first balls, so that the first balls are uniformly distributed along the first ball track in the circumferential direction of the motor side casing;
the knee joint sleeve has a fourth annular groove at a position corresponding to the second annular groove of the transmission side casing, and the fourth annular groove is matched with the second annular groove to form a second ball track for accommodating second balls, so that the second balls are uniformly distributed along the second ball track in the circumferential direction of the transmission side casing,
wherein the annular connector is a first press ring;
the first press ring has external threads on its outer circle, and is detachably connected into the knee joint sleeve by use of threaded connection.

10. The robot according to claim 9, further comprising an inner thigh plate, an outer thigh plate, an inner calf plate and an outer calf plate;
the inner thigh plate and the outer thigh plate are connected to each other through a connector and mounted on a side close to the drive motor and a side close to the reducing transmission mechanism, respectively, and the inner thigh plate is fixedly connected to the motor side casing;
the inner calf plate and the outer calf plate are fixedly connected to the knee joint sleeve.

11. The robot according to claim 10, wherein,
a sidewall of an end of the knee joint sleeve adjacent to the outer thigh plate is provided with a fifth annular groove surrounding a transmission shaft of the reducing transmission mechanism;
the outer thigh plate is provided with a sixth annular groove at a position corresponding to the fifth annular groove, and the sixth annular groove is matched with the fifth annular groove to form a third ball track for accommodating third balls, so that the third balls are uniformly distributed along the third ball track in a circumferential direction of the transmission shaft.

12. The robot according to claim 11, further comprising:
a side cover plate fixed with the inner thigh plate and the motor side casing by screws or by rabbet fitting and screws.

13. The robot according to claim 10, wherein,
the inner thigh plate is fixedly connected to the motor side casing by screws or by rabbet fitting and screws;
the outer calf plate is fixedly connected to the knee joint sleeve by screws or by rabbet fitting and screws;
the outer calf plate is fixedly connected to the knee joint sleeve by screws or by rabbet fitting and screws.

14. The robot according to claim 9, wherein,
the reducing transmission mechanism is a harmonic reducer; and
the motor side casing, a harmonic rigid wheel of the reducing transmission mechanism, and the transmission side casing are fixedly connected by screws or by rabbet fitting and screws.

15. The robot according to claim 9, wherein,
the first annular groove is positioned at a root of a shaft shoulder of one end of the motor side casing;
the third annular groove is positioned on a sidewall of the first press ring;
the second annular groove is positioned at an end of the transmission side casing close to an output end thereof.

16. The robot according to claim 9, further comprising:
a second press ring arranged side by side with the first press ring and positioned at a side of the first press ring away from the motor side casing; the second press ring has external threads on its outer circle, so as to be fixedly connected into the knee joint sleeve by use of threaded connection and tightly press the first press ring towards the first ball track.

* * * * *